Oct. 26, 1948.　　　F. J. DE LONG ET AL　　　2,452,358
AXLE AND FIFTH WHEEL ASSEMBLY FOR FARM WAGONS
Filed Feb. 22, 1945　　　2 Sheets-Sheet 1
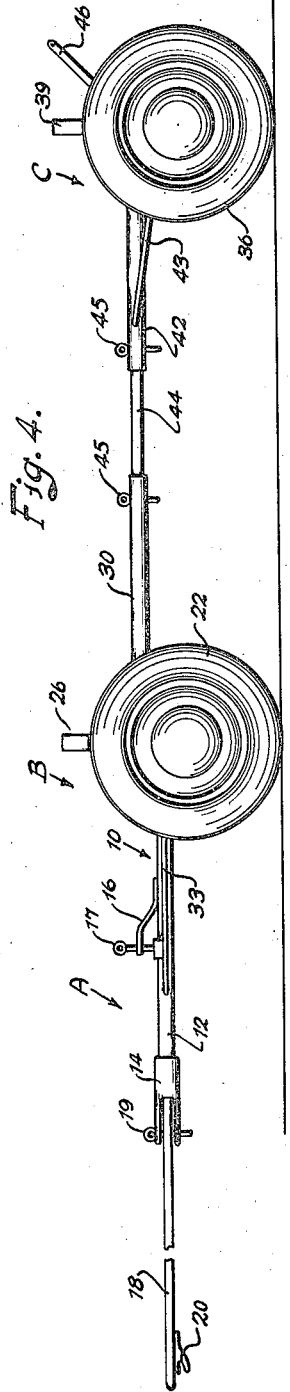
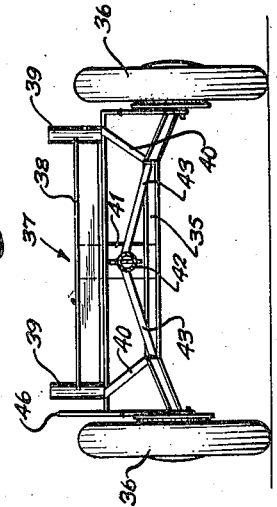
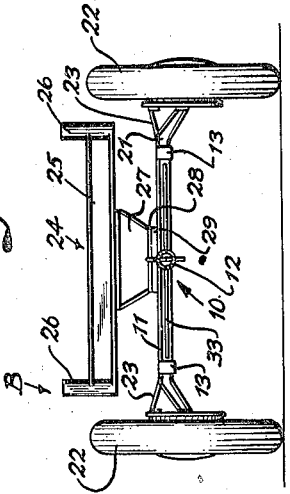
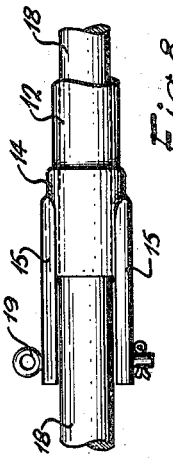
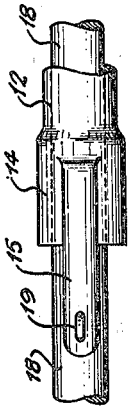
Inventor
Fred Joe DeLong.
Fred J. DeLong.
By Clarence A. O'Brien
and Harvey B. Jacobson
Attorneys

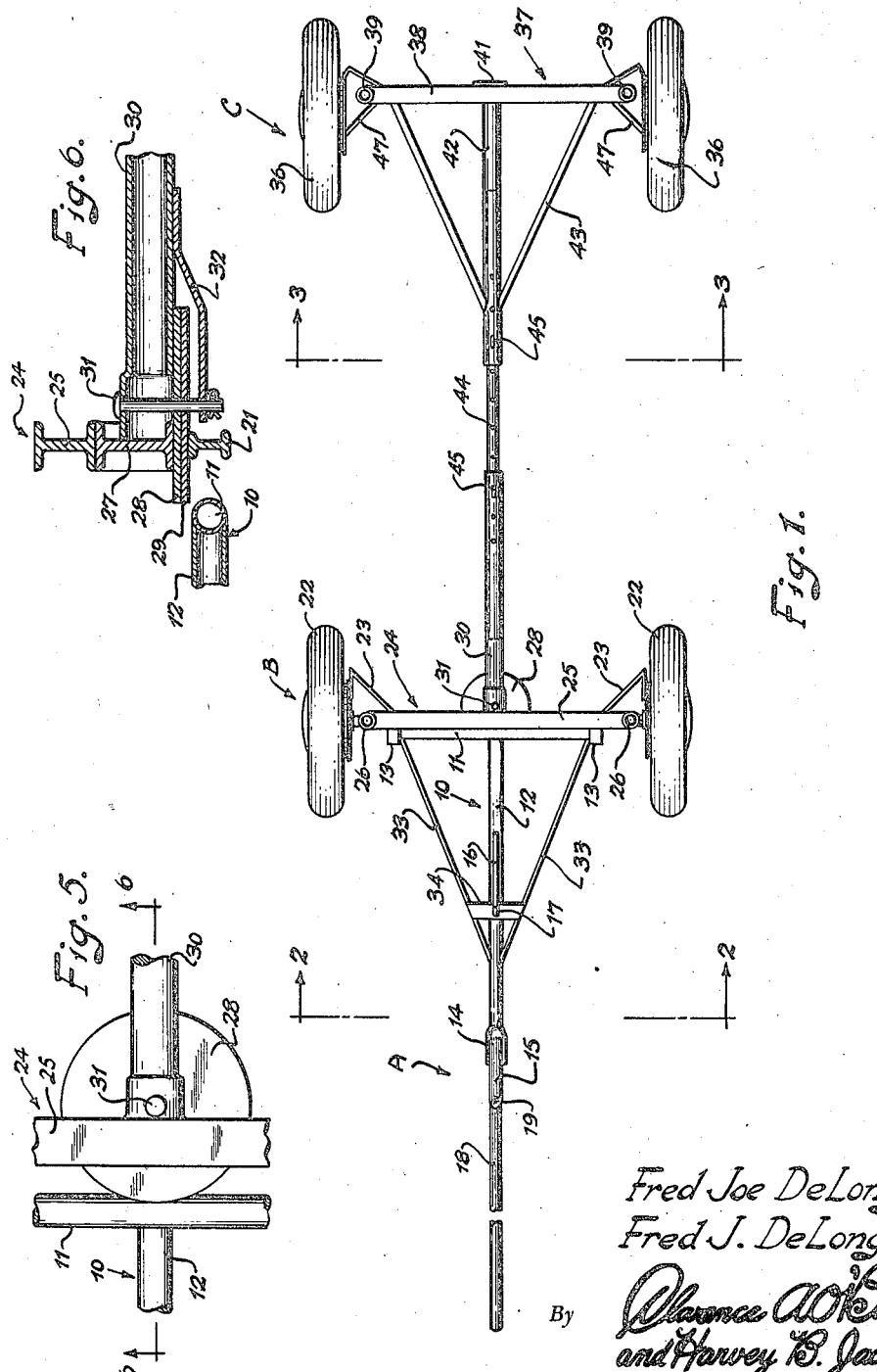

Patented Oct. 26, 1948

2,452,358

UNITED STATES PATENT OFFICE 2,452,358

AXLE AND FIFTH WHEEL ASSEMBLY FOR FARM WAGONS

Fred Joe De Long and Fred J. De Long, Jefferson City, Mo.

Application February 22, 1945, Serial No. 579,214

3 Claims. (Cl. 280—133)

This invention relates to a novel and improved general utility farm wagon and has reference in particular to a wheel-supported chassis of such construction that it serves to accommodate a standard wagon box, a hay rack, and insertable and removable stakes for the hauling of poles, pole wood, and the like.

In carrying out the principles of the invention we have evolved and produced simple and practicable wheeled-chassis, the wheels being rubber tire equipped, and the framework of the chassis being made up of used automobile axles and readily available pipe sections, these parts being welded together in predetermined relationship.

Another phase and therefore an object of the invention has to do with a hingedly mounted sectional tongue construction, this characterized by an inner hingedly mounted section, and an extensible and removable section, said sections being such as to permit the chassis to be attached to tractors and automobiles, or to permit the application thereto of single-trees and double-trees to accommodate a team of horses.

Another object of the invention has to do with a rear hound construction or unit, this adjustably connected to the front wheel supported axle unit by adjustable means, whereby to permit said units to be moved toward and from each other to attain the variable results desired.

Another object of the invention has to do with the incorporation in the front wheel supported unit of a fifth-wheel, this to provide for short turning and reliable steering.

Other features and advantages will become more readily apparent from the following description and accompanying illustrative drawings.

In the drawings, wherein like numerals are employed to designate like parts throughout the views:

Figure 1 is a top plan view of the complete wheel-supported chassis as constructed in accordance with the principles of the present invention.

Figure 2 is a transverse section taken approximately on the plane of the line 2—2 of Figure 1, looking in the direction of the arrows and showing the front wheel supported unit.

Figure 3 is a similar sectional view, this taken on the plane of the line 3—3 of Figure 1, looking rearwardly in the direction of the arrows.

Figure 4 is a side elevational view of the structure seen in Figure 1.

Figure 5 is a fragmentary view illustrating the fifth-wheel construction and associated tongue means.

Figure 6 is a longitudinal sectional view taken approximately on the plane of the line 6—6 of Figure 5, looking in the direction of the arrows.

Figure 7 and 8 are side elevational and top plan views illustrating the coupling means for the sectional tongue arrangement.

Briefly, the sectional tongue structure is unitarily denoted by the reference character A, the front wheel and axle assembly or unit is denoted at B, and the rear wheel and axle assembly or unit at C. These are the three main parts of the overall assemblage.

Referring in detail to the parts of the means A by reference numerals it will be seen that the main tongue section is denoted by the numeral 10. It is of general T-shaped form and comprises the crosshead 11 and forwardly and outwardly extending stem portion 12. These parts are integral and the outer ends of the head portion 11 are mounted for oscillation and suitable bearings 13, to be hereinafter more specifically described. The portion 12 terminates in a coupling 14 (see Figures 7 and 8), this having outstanding diametrically opposite apertured arms or fingers 15. Also, as shown in Figure 4, a bracket 16 is mounted on said stem portion and provided with a removable coupling pin 17. When in use, the extensible and removable section 18 is fitted telescopically between the fingers 15 and is passed through the coupling 14 into the body portion of the stem where it is fastened by the retaining pin 17. Further fastening is made through the medium of the removable pin 19 carried by the fingers 15. The brackets 16 and associated pin 17 also serve to accommodate a double-tree (not shown) when a team of horses is used as the source of power. It might be pointed out that the auxiliary or extended section 18 is provided with a suitable fixture 20 to accommodate a single-tree (not shown).

When a tractor is employed the section 18 is of course removed and then the coupling 14 and pin-equipped fingers 15 serve as a satisfactory means of hitching the main tongue section to said tractor.

The wheel and axle assembly B is shown on a small scale in Figures 1 and 2 and brought out on a larger scale in Figures 5 and 6. As above stated we employ used, that is so-called secondhand axles. These are of the arched type. However, in the present instance the axles are inverted so that the arches extend upwardly. The end portions of the axle 21, as here shown are welded to the hub portions of the front rubber tire equipped wheels 22 and for rigidity, brace connections are made between the axle ends and wheel hubs as indicated at the points 23. The numeral 24 denotes a front bolster comprising an I-beam 25 this having welded to the opposite outer ends thereof a pair of upstanding short pipe sections 26 which serve not only as retaining elements for the wagon box (not shown) but as sockets for log and pole retaining stakes (also not shown). The stakes can be either wood or pipe sections fitted down and into said sockets 26. The intermediate portion of the I-beam 25 is connected by an I-beam web 27 to the central portion of the arch of the axle 21, this by way of the so-called fifth wheel shown to advantage in Figure 6. That is to say, said web 27 is welded to the top disc 28 and the latter sits on a bottom disc 29 welded directly to the central portion of the axle. The web and I-beam 25 are also welded together. A horizontal tube or pipe length 30 is welded to the web and top disc 28 and these parts are connected by a hinge and assembling pin 31 coacting with a keeper 32 carried by said pipe section 30 and serving to accommodate a removable cotter-key on the lower end of said hinge pin. Referring again to the bearing eyes 13, these eyes are on clips bolted to the bottom of the axle 21, using existing holes in the stock part for said purpose. We might mention too at this point, that suitable diagonal braces 33 connect with the T-section 10 and an additional cross-brace 34 is connected thereto and with the part 12 at the converging ends of said braces 33. Furthermore for purposes of stabilization, the braces 33 extend rearwardly beyond the axle and connect with the wheel hubs as shown. Incidentally, all of the main parts are made of pipes, I-beams, and used car axles such as are presently available for such purposes.

Referring now to the rear wheel and axle assembly, this comprises a used axle, that is a used automobile axle, 35 (see Figure 3), this having its ends welded to brake drums on which the rear wheels 36 are mounted. The rear bolster 37 comprises a horizontal I-beam 38 having upstanding short pipe sections 39 which function, as before stated, as abutments as well as sockets for removable stakes (not shown). Suitable connections 40 and 41, vertically arranged and transversely spaced, are provided between the beam 38 and the arched portion of said axle 35. The connection 41 also serves as an anchor for the forwardly extending tube or pipe section 42, this having appropriate diagonal braces 43 connected thereto.

The tubes or pipes 30 and 42, respectively, are in alignment with each other, and a connecting pipe 44 is fitted telescopically therein and held in place by assembling and retaining pins 45. Thus the parts 30, 42 and 44 provide a so-called pole or stringer, this being susceptible of adjustments lengthwise to regulate the overall length of the chassis. Only the rear wheels are provided with brakes and therefore a brake rod connection or lever is indicated at 46, this to accommodate a control rod (not shown) which leads to a desirable point for remote control of the brakes. Additional braces are indicated in the rear wheel axle assembly at the point 47 (see Figure 1).

Reviewing some of the advantages it is evident that the sectional tongue structure is so made that the wagon or chassis, as it is perhaps best called, may be pulled by a tractor, automobile, or team of horses. It is, therefore, to this extent a convertible tongue structure. It is believed that the mode of conversion and the adaptability attending same is clear.

We also desire to stress the fifth-wheel, the structural arrangement shown in Figures 5 and 6, in conjunction with the other figures. Then too, we stress the fact that the front and rear wheel assemblies B and C and means for connecting same together with associated bolsters provide a readily available set-up enabling the farmers to use a regular wagon box, a hay rack, or to haul logs, poles, wood and miscellaneous things of that nature. Furthermore as previously stated, all of the parts, that is the essential parts, are welded together for strength and durability, and the majority of said parts are more or less stationary and are normally available for expediency and assembling a structure susceptible of mass production.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

We claim:

1. In a chassis construction of the class described a forward axle and wheel assembly comprising an inverted arched axle, wheels mounted on the outer ends of said axle, a fifth wheel disc welded on the central portion of said axle, a second corresponding disk superposed and pivotally mounted on said first-named disk, a web attached to and rising from said second-named disk, and a bolster supported above and from said web, together with clips secured to said axle adjacent opposite ends thereof and provided with eyes, said eyes constituting bearings, and a tongue section including a portion rockably mounted in said bearings.

2. In a farm wagon running gear construction of the class described, as a component part thereof, a forward axle and wheel assembly comprising an inverted arched axle, wheels mounted on the outer ends of said axle, a horizontal fifth wheel disc welded on the central upper portion of said axle, a second complemental and corresponding disc superimposed upon and pivotally mounted on said first named disc, a vertical web rigidly attached to and rising from said second named disc, a bolster supported from and above said web, a horizontal pipe-length secured at one end to said web and second named disc, a keeper carried by said pipe end and underlying said first named disc, and a vertical hinge pin passing down through said pipe end and disc and connected with said keeper.

3. In a running gear for farm wagons of the class described, a wheel supported frame structure including a rear bolster, a front wheel assembly comprising an axle horizontally disposed, wheels mounted on the outer ends of said axle, a horizontal fifth wheel disk mounted on the central upper portion of said axle, a second complemental and corresponding disk superimposed and pivotally mounted upon the first named disk, a vertical web rigidly attached to and rising from said second named disk, a bolster supported from and above said web and cooperable with said first named bolster, bearing eyes connected to opposite end portions of said axle, a T-shaped unit embodying a cross head and a centrally disposed angularly arranged stem, said cross head being located in spaced parallelism with respect to the axle and having its ends mounted for oscillation in said bearing eyes, said stem being of hollow tubular form and adapted to accommodate a removable as well as projectible and retractible draft member.

FRED JOE DE LONG.
FRED J. DE LONG.

REFERENCES CITED

The following references are of record in the file of this patent:

UNITED STATES PATENTS

| Number | Name | Date |
|---|---|---|
| 551,224 | Neill et al. | Dec. 10, 1895 |
| 801,194 | Leverentz | Oct. 3, 1905 |
| 858,590 | Fitzpatrick et al. | July 2, 1907 |
| 951,429 | Sumner | Mar. 8, 1910 |
| 961,844 | Craig | June 21, 1910 |
| 972,658 | Smith | Oct. 11, 1910 |
| 990,793 | Woodward | Apr. 25, 1911 |
| 1,058,693 | Bartholomew | Apr. 8, 1913 |
| 1,079,475 | Davis | Nov. 25, 1913 |
| 1,161,535 | Scoggins | Nov. 23, 1915 |
| 1,177,450 | Ryerson | Mar. 28, 1916 |
| 1,213,938 | Norton | Jan. 30, 1917 |
| 1,915,864 | Nabors | June 27, 1933 |
| 2,048,149 | Voorhees, Jr. | July 21, 1936 |
| 2,183,682 | Kudrna | Dec. 19, 1939 |
| 2,342,618 | Thieman | Feb. 22, 1944 |

FOREIGN PATENTS

| Number | Country | Date |
|---|---|---|
| 460,967 | Great Britain | 1937 |